3,472,420
SAFETY VENT STRUCTURE
Raymond L. Hiatt, Homewood, Ill., assignor, by mesne assignments, to Union Tank Car Company, a corporation of Delaware
Filed June 2, 1967, Ser. No. 643,238
Int. Cl. B65d 87/48
U.S. Cl. 220—89    1 Claim

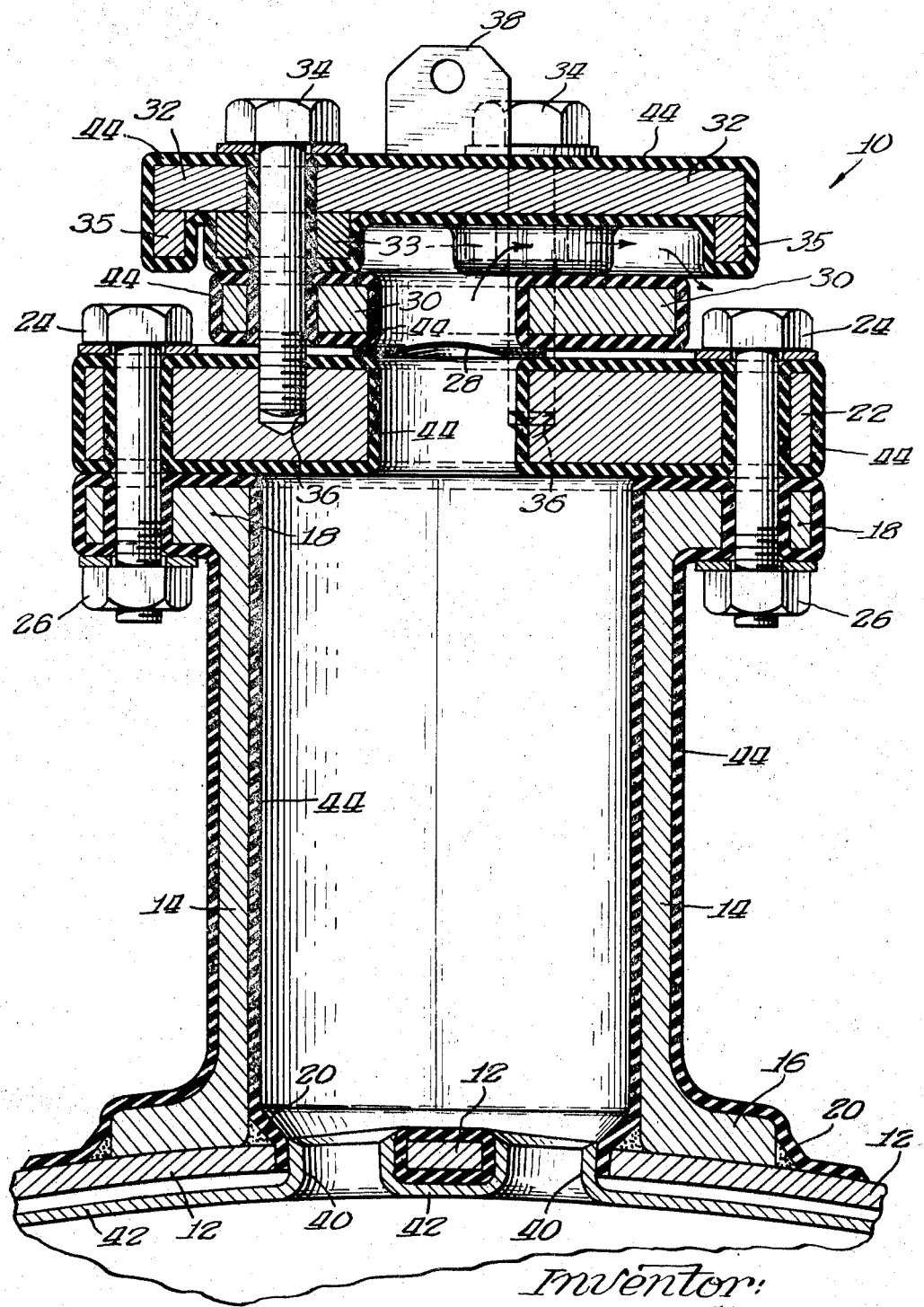

ABSTRACT OF THE DISCLOSURE

A safety vent structure for tank cars and the like. A nozzle is mounted on the outer surface of the tank, so that one end of the nozzle surrounds one or more apertures in the tank wall. The other end of the nozzle holds a frangible disc designed to rupture and vent the nozzle to atmosphere when the pressure within the nozzle exceeds a predetermined limit. The total sectional area of the apertures is less than the sectional area of the nozzle, so that pressure within the nozzle increases at a slower rate than pressure within the tank.

BACKGROUND, SUMMARY, DRAWINGS

This invention relates to a safety vent structure for use with tanks, and particularly, with transportable tanks such as are associated with railway tank cars and the like. Although the invention will be described in the environmental context of a railway tank car, it should be understood that it may be advantageously employed in connection with many other types of fluid storage or transport units.

A fluid being transported in a railway tank car, as for example a volatile liquid, may under certain conditions create a pressure within the tank that exceeds a maximum permissible level dictated by the design characteristics of the tank and the materials from which it is formed. Accordingly, it has long been the practice to provide safety vents which automatically vent the tank to atmosphere when this maximum permissible pressure level is reached, thus preventing tank damage or failure. One common type of safety vent designed for this purpose has involved the use of a frangible element, such as a thin lead disc, one side of which is in fluid communication with the interior of the tank and the other side of which is in fluid communication with the atmosphere. Thus, when the pressure within the tank reaches the maximum permissible level, the frangible element ruptures, allowing fluid within the tank to escape to atmosphere and thus reducing the tank pressure.

Such prior devices, however, have not been found to be entirely satisfactory, inasmuch as they have not had the ability to discriminate between transient as opposed to steady state pressure overloads. For example, in the case of a tank car almost entirely filled with a liquid, an impactor other sudden acceleration applied to the car will cause a momentary surge of liquid within the car. This momentary surge of liquid will in turn compress the gas in the space above the liquid, and may thereby cause an isolated transient pressure increase within the car which exceeds the predetermined maximum safety level. Under such conditions, the prior art safety vent structures would be actuated to vent the interior of the tank to atmosphere to relieve the overpressure, even though the overpressure is only momentary, and the steady state pressure within the tank remains below the maximum permissible level. This is clearly undesirable, particularly where the safety vent employs a frangible element as the pressure responsive means, since the tank is opened to atmosphere and the liquid may splash out of the tank or be contaminated. Accordingly, it is desirable to provide a safety vent structure which is not responsive to transient pressure overloads and which operates to vent the interior of the tank to atmosphere only when the steady state pressure within the tank exceeds the maximum permissible level.

In order to accomplish the foregoing goal of discrimination between transient and steady state pressure overloads, the present invention provides a nozzle which is mounted on the outer surface of the tank wall. The nozzle includes first and second end portions, and the first end portion has associated therewith pressure responsive means, preferably a frangible element. The pressure responsive means operates in response to an overpressure within the nozzle to vent the nozzle to atmosphere. The second end portion of the nozzle is attached to the tank wall and surrounds a passageway defined in the tank wall. The passageway, which comprises one or more apertures in the tank wall, serves to provide fluid communication between the interior of the nozzle and the interior of the tank. The total sectional area of the apertures which constitute the passageway is less than the sectional area of the nozzle, with the result that the pressure within the nozzle increases at a slower rate than that within the tank itself. Thus the pressure increase resulting from a momentary liquid surge within the tank is effectively delayed, so that the pressure effects of the surge subside before the pressure within the nozzle increases sufficiently to actuate the pressure responsive means. In this manner, the pressure responsive means is actuated only by a steady state overpressure within the tank.

A safety vent structure constructed in accordance with the present invention may be readily installed in existing tank cars and other fluid storage or transport units. The structure is mounted on the exterior of the tank wall and the only necessary modification to the tank wall is the provision of the apertures therein which constitute the passageway between the interior of the tank and the interior of the nozzle. The safety vent structure itself may be lined with suitable protective materials, and may be installed without undue damage to existing tank linings.

The foregoing objects and features of the invention will be more fully appreciated in light of the following detailed description, with illustrative reference to the drawing, in which there is shown a sectional elevation of an exemplary safety vent structure constructed in accordance with the invention and mounted on the outer wall of a tank.

DESCRIPTION OF EXEMPLARY EMBODIMENT

With reference to the drawing, there is shown a preferred embodiment of a safety vent structure generally denoted by the numeral 10. The safety vent structure 10 is associated with a portion of a conventional tank car which includes a tank wall 12. Attached to the wall 12 is a nozzle 14 which is conveniently cylindrical in shape and which has lower and upper annular flanges 16 and 18, respectively. The lower flange 16 of the nozzle 14 is attached to the tank wall 12 by welding, as indicated by the numeral 20.

An annular adapter ring 22 rests against the upper flange 18 of the nozzle 14 and is secured thereto with a plurality of bolts 24 and nuts 26. Resting on the adapter ring 22 and covering the central aperture thereof is a frangible disc 28 which may be fabricated from any suitable materials, and which is designed to rupture when a predetermined maximum pressure level exists within the nozzle 14, as will hereinafter be more fully described.

An annular retainer ring 30 lies atop the frangible disc 28, and a cover 32 in turn rests upon the retainer ring. The cover 32 includes a plurality of spaced annular bosses 33 and a downwardly extending annular rim 35. The bosses 33 bear against the retainer ring 30, and a plurality of threaded studs 34 pass through the cover 32, the bosses 33 and the retainer ring 30 and mate with suitable threaded apertures 36 in the adapter ring 22. Thus, when the studs 34 are tightened down, the frangible disc 28 is held firmly in place between the adapter ring 22 and the retainer ring 30. It will be noted that the frangible disc 28 is positioned such that its upper surface is in fluid communication with the atmosphere, while its lower surface is in fluid communication with the interior of the nozzle 14. Accordingly, in the event of rupture of the disc 28, fluid from the nozzle 14 will pass through the central aperture of the retainer ring 30, between the bosses 33, and out from under the rim 35 of the cover 32. The cover 32 also includes a suitably apertured lifting lug 38.

Defined in the tank wall 12 are a pair of apertures 40 which constitute a fluid passageway between the interior of the tank and the interior of the nozzle 14. It will be noted that the total sectional area of the apertures 40 is less than the sectional area of the nozzle 14. As a result, in the event of a momentary surge of liquid within the tank, the time rate of increase of the liquid level within the nozzle 14 will be less than it would be if the total area of the apertures 40 were equal to the sectional area of the nozzle. Consequently, the time rate of increase of the pressure existing in the space above the liquid level in the nozzle 14 will lag the rate of pressure increase within the tank. Thus the pressure effects of a momentary surge of liquid within the tank are delayed by a factor which is proportional to the ratio of the area of the apertures 40 to the sectional area of the nozzle 14. More specifically, if the area of the apertures 40 is made larger with respect to the area of the nozzle 14, the rate of increase of pressure within the nozzle 14 will approach the rate of increase of pressure within the tank; conversely, as the area of the apertures 40 is decreased, the rate of pressure build-up within the nozzle 14 will lag that of the tank by an increased amount.

Accordingly, the safety vent structure 10 is responsive only to steady state overpressures within the tank. During a momentary liquid surge condition, if the area of the apertures 40 were equal to the sectional area of the nozzle 14, the pressure existing in the space above the liquid level in the nozzle might be sufficient to cause the frangible disc 28 to rupture. However, due to the fact that the area of the apertures 40 is less than that of the nozzle 14, the liquid level and consequently the pressure within the nozzle 14 increase at a slower rate, and the pressure does not reach a level sufficient to rupture the frangible disc 28 before the pressure effects of the momentary surge subside. It is only when the overpressure within the tank persists for a relatively long period of time that the pressure within the nozzle 14 is able to equal that of the tank, and only then will the frangible disc 28 be ruptured.

The ratio of the areas of the apertures 40 and the nozzle 14 will depend upon such factors as the design characteristics of the tank and the type of liquid being transported, with particular reference to the maximum time during which a pressure overload may be tolerated, and the selection of appropriate ratios will be within the abitlity of those having ordinary skill in the art. In general, it has been found that normal transient overloads persist only for very short time intervals, typically fractions of a second, and, consequently, an area ratio which results in a corresponding time lag in pressure increase is satisfactory.

The tank wall 12 may be lined as shown with a suitable protective material 42, such as rubber or the like. In addition, the nozzle 14, the rings 22 and 30, and the cover 32 may include inner and outer linings 44 of such protective materials. It will be noted that the apertures 40 are spaced near the inner circumference of the nozzle 14. This arrangement insures that liquid within the nozzle 14 will completely drain back into the tank. A single central aperture would result in some liquid remaining in the nozzle 14, due to the curved configuration of the tank wall 12. It should be understood, however, that any number of apertures may be employed, the sole criterion being that the total area of the apertures is less than the sectional area of the nozzle 14.

Although an embodiment constructed in accordance with the present invention has been described with the requisite particularity, the disclosure is of course only exemplary. Consequently, numerous changes in details of construction, in size, configuration and arrangement of components and materials, and in modes of application, will be apparent to those familiar with the art and may be resorted to without departing from the scope of the invention as set forth in the following claim.

I claim:

1. In a tank, a safety vent structure comprising: a nozzle mounted on the exterior of a wall of said tank, said nozzle having first and second end portions respectively defining first and second openings for providing fluid communication with the interior of said nozzle; apertures defined in said tank wall and communicating with said sceond opening, the total sectional area of said apertures being less than the sectional area of said nozzle; an annular adapter ring mounted on said first end of said nozzle, and pressure responsive means comprising a frangible disc covering the opening in said adapter ring, an annular retainer ring atop said frangible disc, and a cover resting on said retainer ring, said cover including a plurality of spaced bosses adapted to bear against said retainer ring while providing fluid communication between said first opening and the atmosphere, and means for securing said retainer ring and said cover to said nozzle, said means comprising a plurality of threaded studs passing through the cover, the bosses and the retainer ring and mate with suitable threaded apertures in the adapter ring.

References Cited

UNITED STATES PATENTS

| 2,136,474 | 11/1938 | Straty | 220—63 |
| 2,652,172 | 9/1953 | Negola | 220—63 |
| 3,132,761 | 5/1964 | Sylvester | 220—63 XR |
| 3,294,277 | 12/1966 | Wood. | |
| 3,310,197 | 3/1967 | Folmsbee et al. | |

RAPHAEL H. SCHWARTZ, Primary Examiner